(No Model.) 7 Sheets—Sheet 1.
W. F. BECK.
CASH REGISTER, INDICATOR, AND RECORDER.
No. 481,777. Patented Aug. 30, 1892.
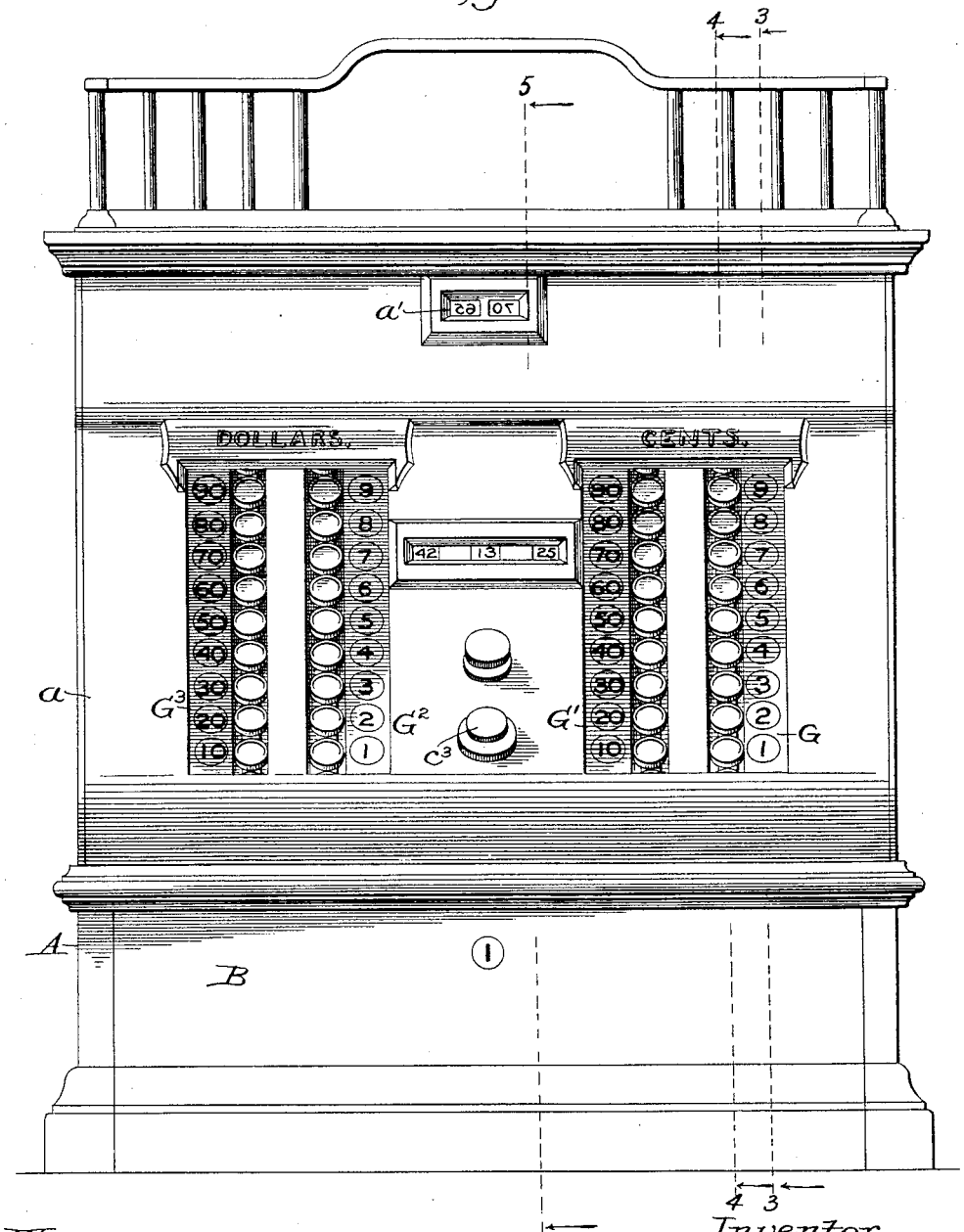

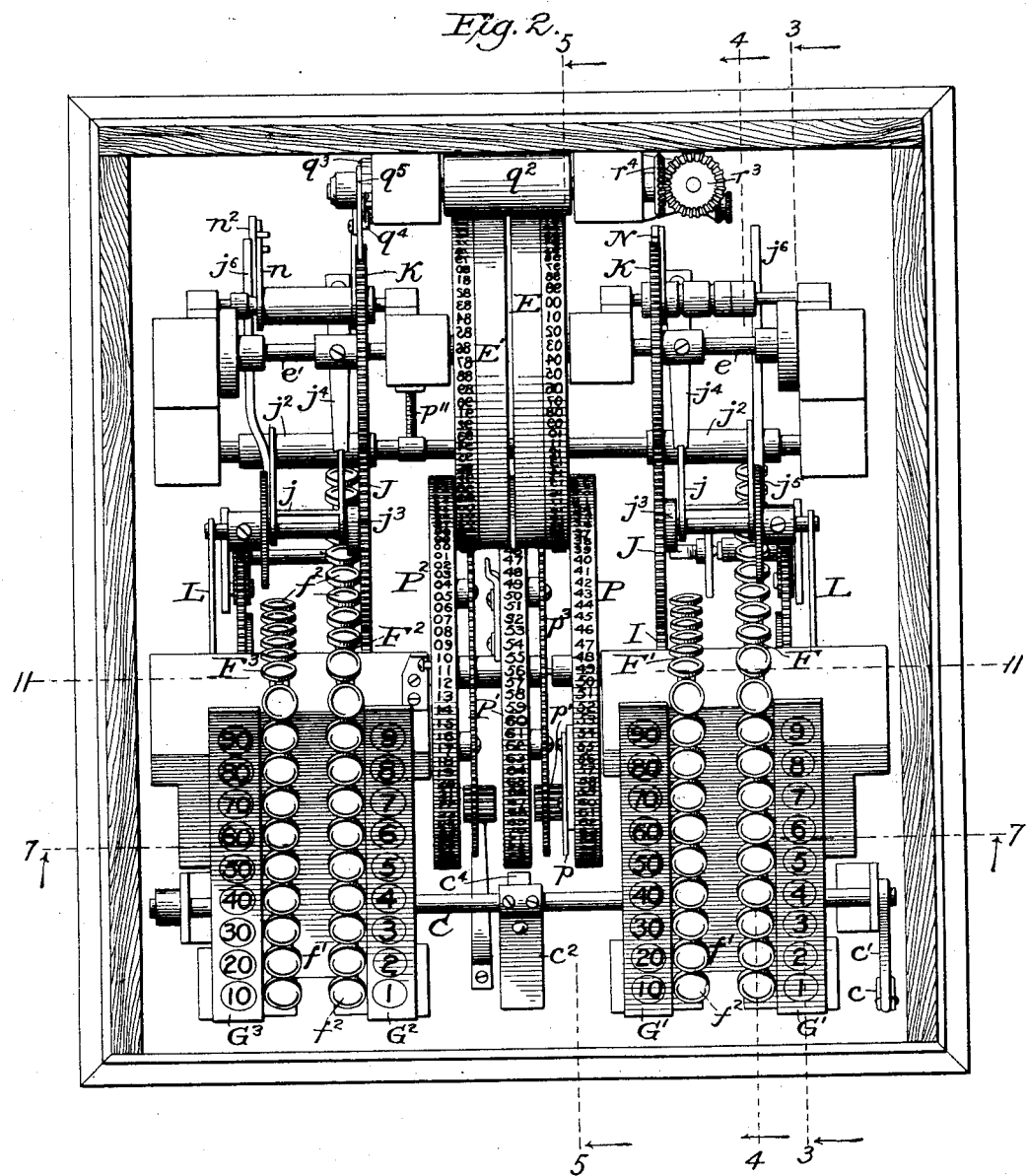

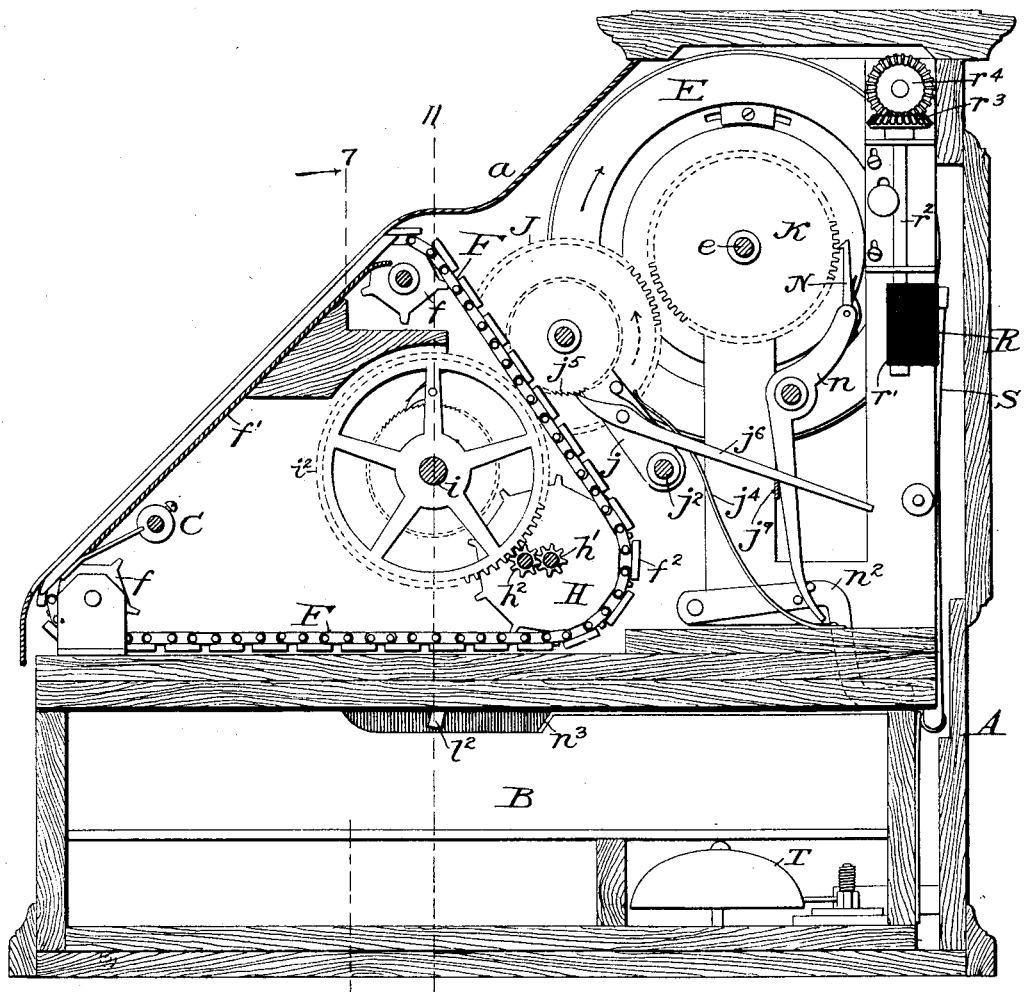

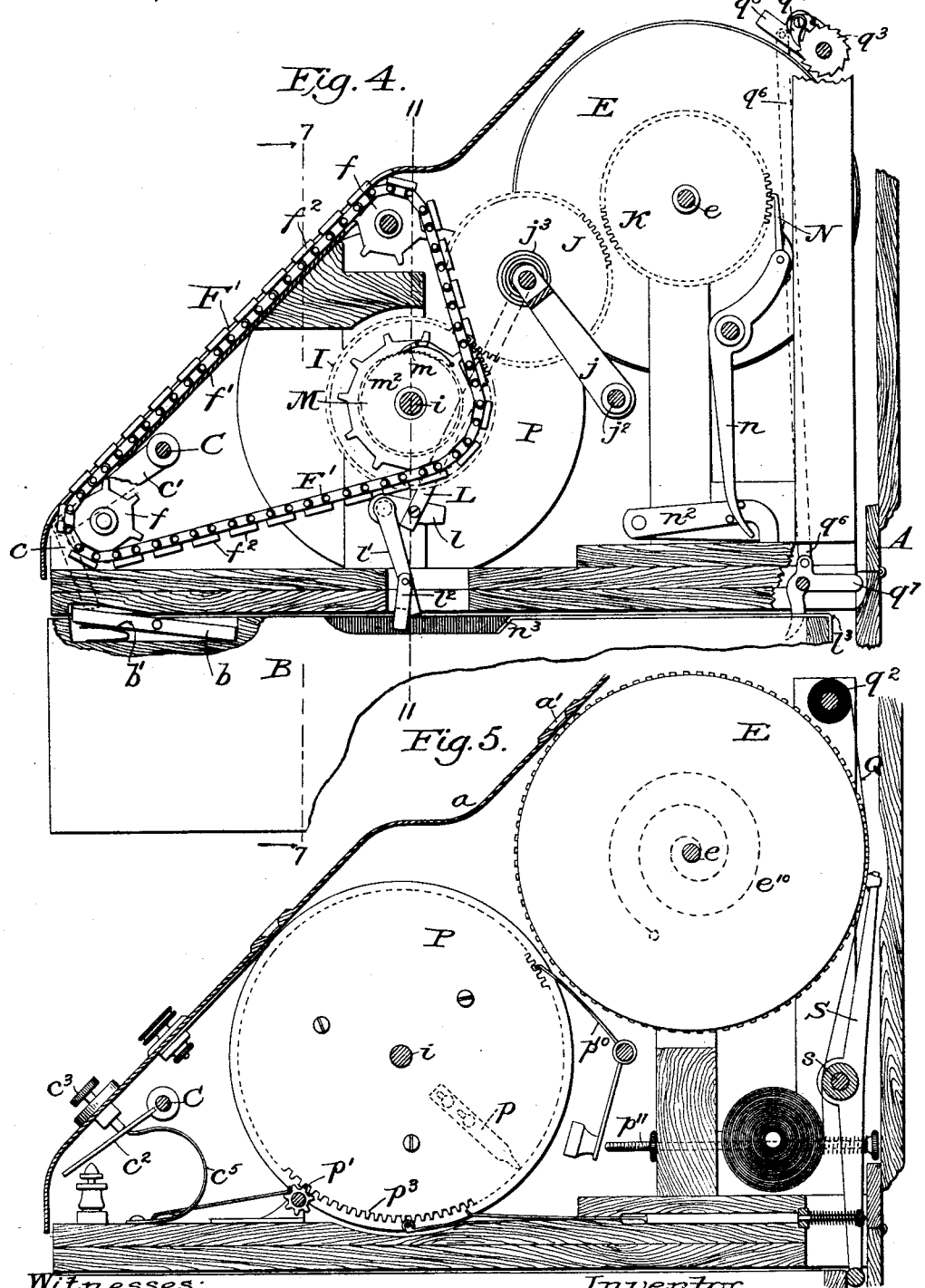

(No Model.) 7 Sheets—Sheet 5.

W. F. BECK.
CASH REGISTER, INDICATOR, AND RECORDER.

No. 481,777. Patented Aug. 30, 1892.

Witnesses:
James F. Duhamel
Fabrius J. Elmore

Inventor:
W. F. Beck
By P. T. Dodge
Atty.

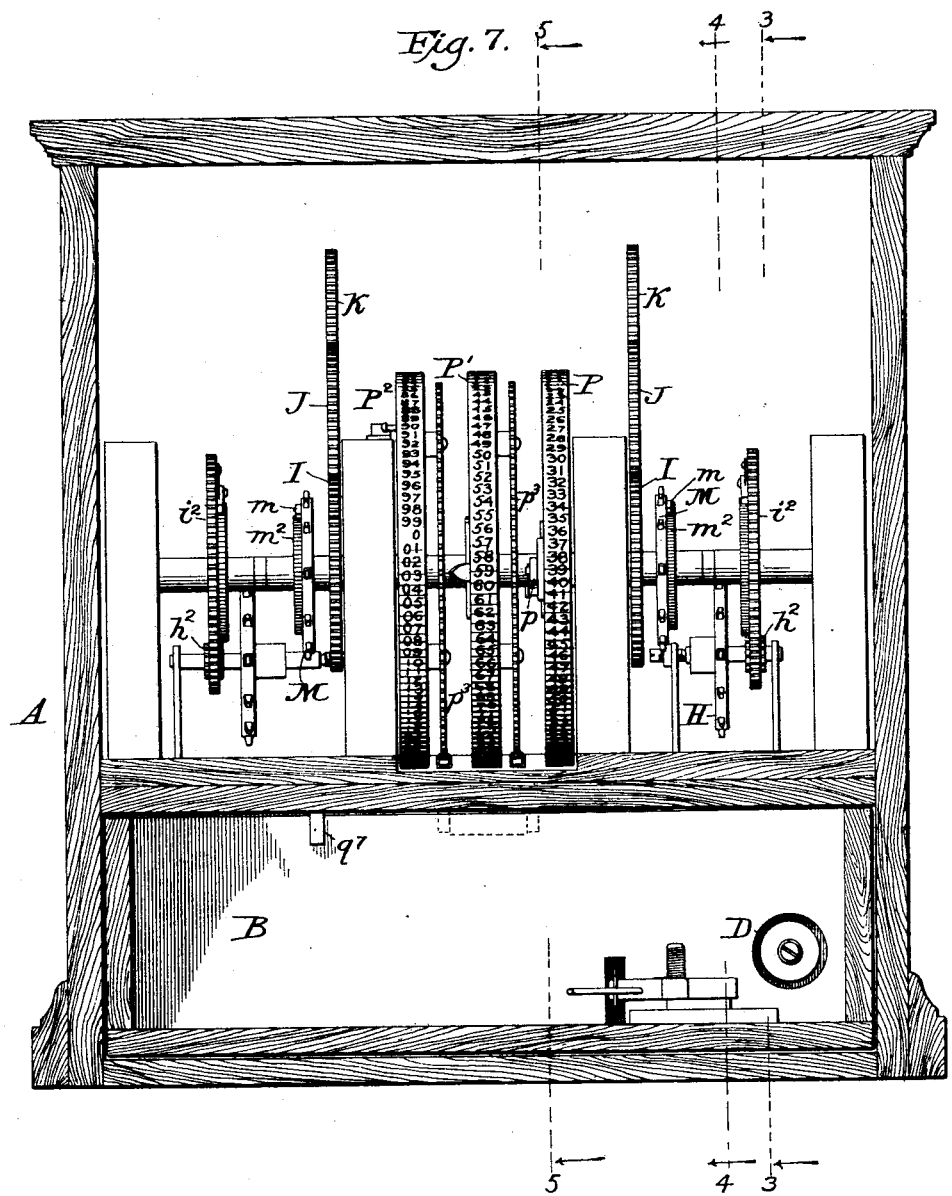

(No Model.) 7 Sheets—Sheet 7.

W. F. BECK.
CASH REGISTER, INDICATOR, AND RECORDER.

No. 481,777. Patented Aug. 30, 1892.

Witnesses:
James F. Duhamel
Fabius J. Elmore

Inventor:
W. F. Beck
By P. J. Dodge
Atty.

UNITED STATES PATENT OFFICE.

WARREN F. BECK, OF KNOXVILLE, PENNSYLVANIA, ASSIGNOR TO THE EUREKA CASH REGISTER COMPANY, OF SAME PLACE.

CASH REGISTER, INDICATOR, AND RECORDER.

SPECIFICATION forming part of Letters Patent No. 481,777, dated August 30, 1892.

Application filed February 27, 1892. Serial No. 423,031. (No model.)

*To all whom it may concern:*

Be it known that I, WARREN F. BECK, of Knoxville, county of Tioga, and State of Pennsylvania, have invented a new and useful Improvement in Cash-Registers, of which the following is a specification.

The aim of my invention is to provide a mechanism whereby the amount of a sale or other commercial transaction may be temporarily indicated, the aggregate amount of the successive sales permanently registered, and the individual amounts successively printed on a record-strip.

To this end the invention consists in a peculiar construction and arrangement of various co-operating mechanisms.

It embraces as one of its leading features the employment of endless chains adapted to be moved by the finger different distances to actuate the mechanisms.

It also embraces, in combination with such chains, intermediate connections for turning the indicator-wheels ahead and then allowing them to return to their original positions preparatory to the next indication.

It also embraces an arrangement of mechanisms through which motion is communicated from the chains aforesaid to the register-wheels, so as to turn them intermittingly in one direction.

It further embraces connections through which the chains operate to effect the action of rotary printing-wheels and attendant parts for feeding a record-strip thereby and effecting the impression upon said strip.

Figure 6:
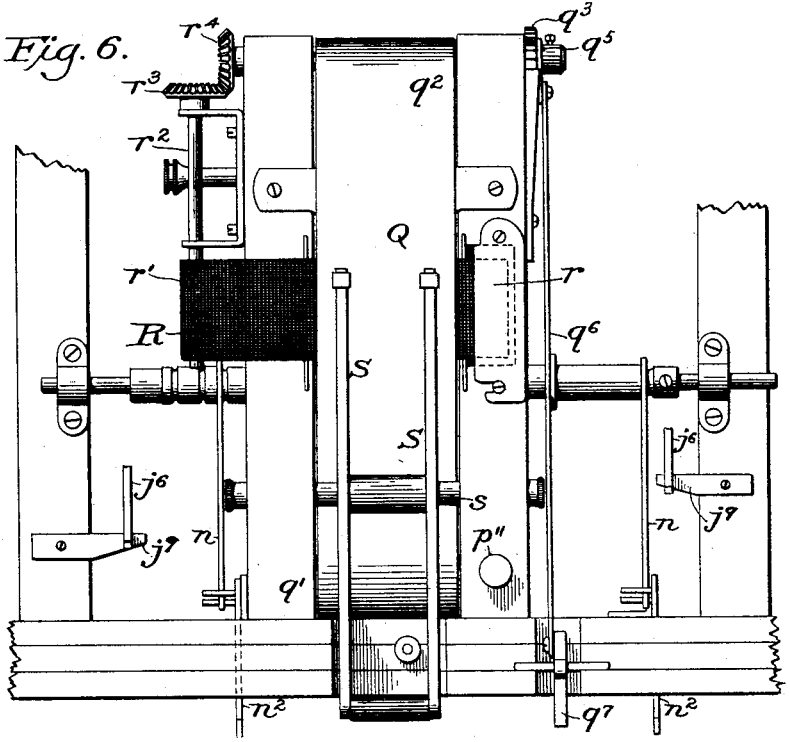
Figure 11:
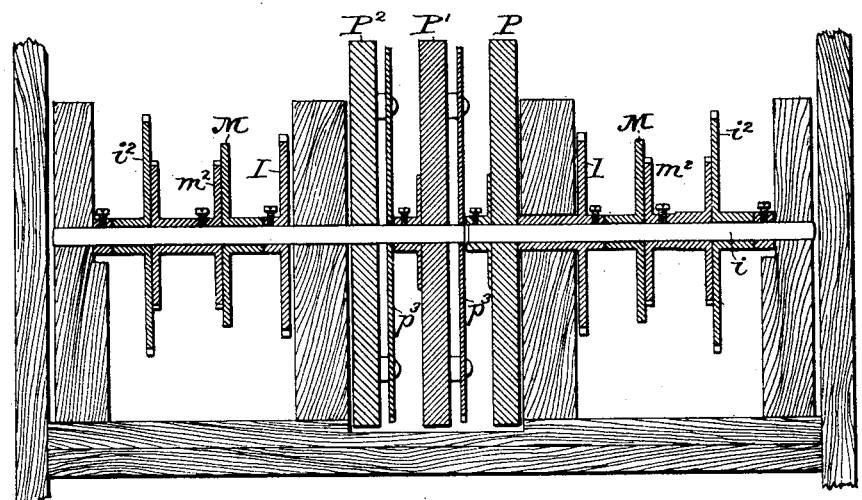
Figure 8:
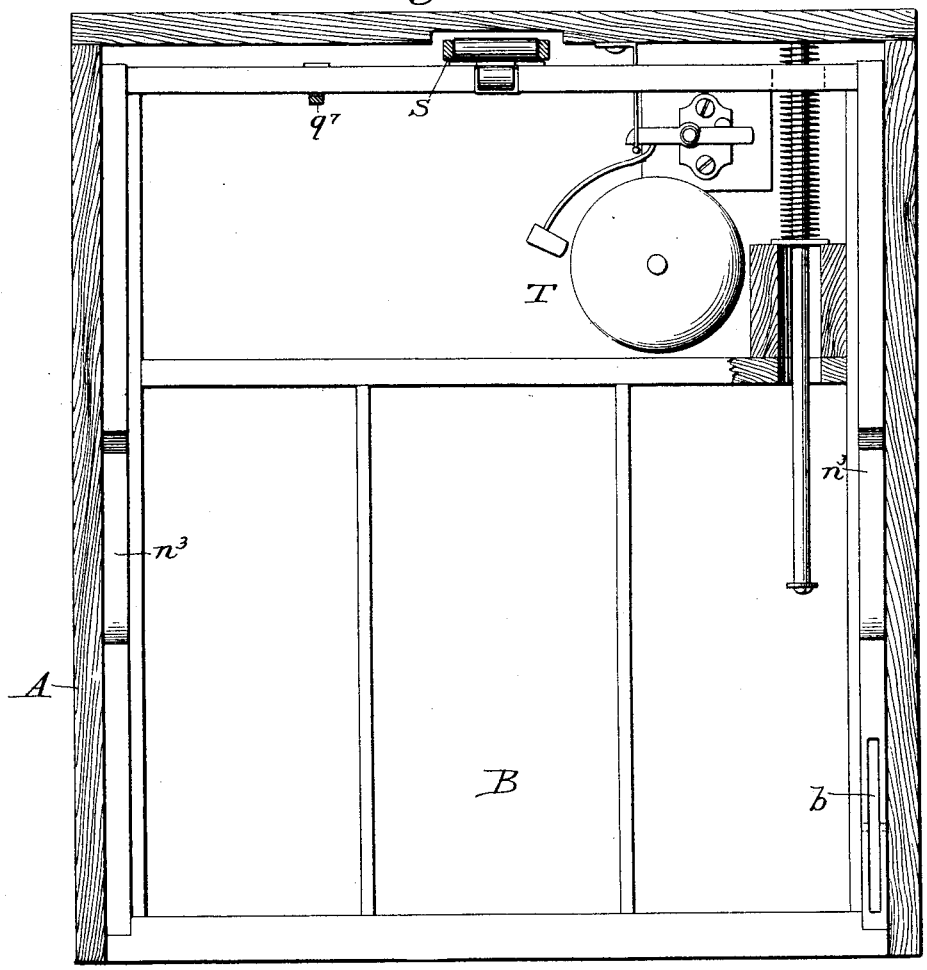
Figure 9:
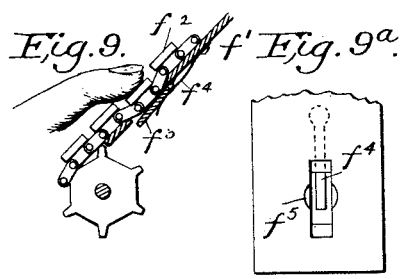
Figure 9A:
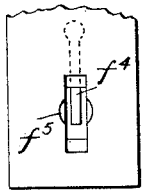
Figure 10:
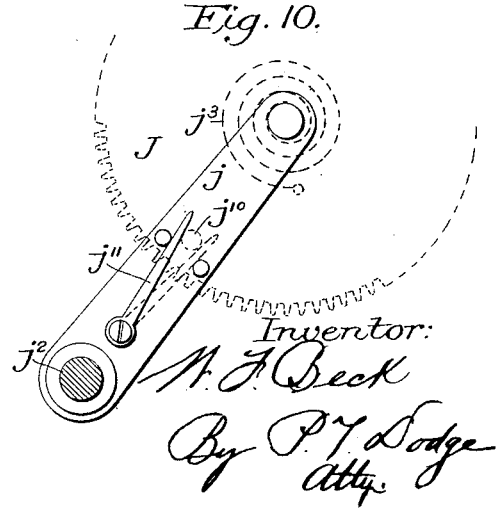

In the accompanying drawings, Figure 1 is a front elevation of my machine. Fig. 2 is a top plan view of the same with the top of the casing removed to expose the operative parts to view. Fig. 3 is a vertical section from front to rear on the line 3 3, Figs. 1, 2, and 4, looking in the direction indicated by the arrows thereon. Fig. 4 is an elevation from front to rear on the line 4 4 of the same figures. Fig. 5 is a vertical section from front to rear on the line 5 5 of the same figures. Fig. 6 is a rear elevation of the printing mechanism and adjacent parts, the casing being removed. Fig. 7 is a transverse vertical section on the line 7 7 of Figs. 2, 3, and 4 looking in the direction indicated by the arrows thereon. Fig. 8 is a plan view illustrating the sliding till and its connections. Fig. 9 is a vertical section showing the means for arresting the motion of the chains at the proper points as they are moved by the finger. Fig. $9^a$ is a plan view of the same. Fig. 10 is a detail view showing the stop devices for the winding-wheel. Fig. 11 is a vertical section on the line 11 11, showing details of the gearing.

Referring to the drawings, A represents an external casing or frame, which may be of any suitable form and construction adapted to sustain the operative parts and having, by preference, an inclined front wall or plate $a$, with openings through which the registrations are effected and exposed.

B is a till or tray mounted in the base of the frame and arranged to slide inward and outward. When closed, it is automatically locked, as shown in Fig. 4, by a latch $b$, pivoted therein and urged upward at one end by spring $b'$, so that it engages against an overlying shoulder in the frame. Its disengagement is effected by means of a pin $c$, carried by crank-arms $c'$ on a transverse rock-shaft C, provided, as shown in Fig. 5, with a second arm $c^2$, acted upon by a push-button $c^3$, rising through the front plate, so that when the button is depressed against the action of the lifting-spring $c^5$ it disengages the latch $b'$ and releases the till. The till is urged forward constantly by a horizontal spiral spring lying in the base of the frame and acting against a shoulder or bearing in the till, as shown in Fig. 8. When the till is unlocked, it is automatically thrown open by this spring.

Passing now to the indicating mechanism, E and E' represent two large independently-turning indicator-wheels mounted on horizontal shafts $e$ and $e'$ in the top of the frame and each bearing on its surface numbers from "0" to "99," which numbers are exposed, one at a time, through openings $a'$ in the front plate of the frame. One wheel represents cents and the other dollars, and they are intended to indicate temporarily the amounts of the successive sales. These wheels receive motion through connections, which will be presently described, upon four endless chains F F' F$^2$, &c., arranged in parallel lines in the front of the case and sustained, as shown in Fig. 4, by toothed pulleys $f$ and an underlying plate $f'$. The front plate is slotted vertically over each chain, in order to expose the top of the latter, and the chain is provided with finger-keys or other projections $f^2$, by means of which the operator, pressing his finger thereon, can slide the chain endwise in a downward direction over the supporting-plate $f'$. Adjacent to each chain, upon the plate, I fix a scale of numbers G G', &c. These numbers arranged, as shown in Fig. 1, in four rows, the first row on the right, representing cents, running in an upward direction from "1" to "9," the next row, representing tens of cents, from "10" to "90," the third, representing dollars, from "1" to "9," and the fourth and last row on the left, also representing dollars, from "10" to "90." The amount of an indication or registration is determined by the distance which the chain or chains are moved. In order to effect a given registration, the operator has only to place his finger upon that finger-piece which stands adjacent to the required number—for example, "6"—and then move the chain downward until the finger-piece arrives at the lowest number—"1." It will be observed that each chain is free to move a greater or less distance, but that the adjacent scales or numerals enable the operator to instantly determine the length of movement required for each registration and to effect such movement without hesitation or uncertainty. At the lower end of each chain-supporting plate $f'$ there is a sinking or downwardly-yielding section $f^3$, Fig. 9, sustained by a spring $f^4$, so that when the button or finger-piece arrives at the lower limit of its movement it will sink into a cavity $f^5$, formed in the underlying plate $f'$, and thus have its motion positively arrested. It will be observed that the buttons stop always at the same point in their travel, but that they start at different points, the length of travel being in this manner controlled to effect different registrations. The essential feature of my invention in this regard lies in the employment of endless chains to be operated by the attendant as a means of actuating the registering or indicating mechanisms, and it is to be understood that these chains may be modified in form and arrangement and that they may be combined, through any suitable devices, with registering or indicating mechanism of any suitable character.

I will now describe the connections, as shown, through which the chains turn the indicator-wheels E E', &c. The first chain F passes, as shown in Fig. 3, around a sprocket wheel or drum H, which in turn communicates motion through intermediate pinions $h'$ and $h^2$ to a gear-wheel I, fixed on a shaft $i$, which also carries a spur-gear $i^2$. (See Figs. 2, 3, and 7.) Adjacent to the wheel I, in position to engage the same, is a second gear-wheel J, carried by a vibrating arm $j$, turning on a pivot $j^2$. Behind the pinion J there is fixed to the shaft of the indicator-drum E a gear-wheel K. The three wheels I, J, and K stand in line, and the distance between the wheels I and K is such that wheel J may be thrown by the movement of its supporting-arm into engagement with the wheels I and K alternately. The wheel J has its shaft encircled by a coiled spring $j^3$, which tends constantly to turn the wheel in the direction indicated by the dotted arrow. A spring $j^4$ presses the wheel-carrying arm forward, so that wheel J stands normally in engagement with wheel I. The wheel J carries a ratchet-wheel $j^5$, engaged by a pawl-lever $j^6$ pivoted to its carrying-arm. When, therefore, the chain F is moved forward to effect an indication, it communicates motion positively through the intermediate parts to wheel J, causing the latter to wind its spring, the pawl $j^6$ acting to hold the wheel against retrograde motion. From the shaft of wheel J an arm L is extended downward to an elbow-lever $l\,l'$, pivoted to the frame and carrying at its lower end a pivoted finger $l^2$, acted upon by a shoulder $l^3$ on the side of the till, so that when the till is opened it acts through said intermediate parts to swing the shaft backward and carry the wheel J out of engagement with wheel I and into engagement with the gear of indicator-wheel E. As this is effected the rear end of the pawl $j^6$ encounters a stop $j^9$, (see Fig. 3,) by which it is disengaged from the ratchet-wheel $j^5$, thereby unlocking the wheel J, so that the spring may turn the same and thereby impart a rotary motion to the indicator-wheel E, causing it to expose an appropriate number to view. The wheel J is arrested in its rotary movement (see Fig. 10) by a stud $j^{10}$ on its side encountering a stop-finger $j^{11}$ on the wheel-carrying arm. By means of this stop the wheel is always returned to and compelled to start from the same position. Being turned forward from this position a greater or less distance, according to the length of the movement of the chain, and returning again always to the original point, it follows that it will advance the indicator-wheel a distance exactly corresponding to the movement of the chain. In order that the wheel J may make one complete revolution and no more to effect the highest indication, the stop $j^{11}$ is pivoted and allowed to swing to and fro a distance equal to one tooth or number. As the second chain represents tens of cents, it is necessary that it shall by a given movement turn the indicator-drum much farther than it was turned by an equal movement of the first chain. For this reason the second chain F' is arranged to act, as shown in Fig. 4, directly on a sprocket-wheel M, mounted loosely on the shaft $i$ and carrying a pawl $m$, which engages a ratchet-wheel $m^2$, fixed on the shaft. This ratchet connection permits the parts to turn ahead under the influence of the first chain without affecting the second chain. When, however, the second chain is operated, it imparts motion through the wheel M and the ratchet mechanism to the shaft $i$ and its gear-wheel I, whence it is communicated first to the wheel J and thence, with the assistance of the spring, to the wheel K and the indicator-drum in the manner before explained. In short, the action of the second chain upon the indicator is the same as that of the first chain, except that the intermediate gearing is such that the drum receives the greater movement.

The drum E' for indicating dollars is operated by the chains $F^2$ and $F^3$ by mechanisms identical with those employed for driving the first drum. These mechanisms, being fully shown in the drawings, need not, therefore, be separately described in detail. Each of the indicator-drums E' and E as it is turned ahead (see Figs. 3 and 4) is held by an independent spring-actuated pawl N, carried on the upper end of a lever $n$, pivoted to the main frame and having its lower curved end passed between pins on a gravitating arm $n^2$, pivoted to the frame and resting at the lower end on the edge of the till-cover. The till is recessed in the upper edge at $n^3$, so that when the till is opened the arms $n^2$, falling into the recesses, will cause the levers $n$ to throw the pawls out of engagement, and thereby release the indicator-drums, which are immediately restored to their original or zero positions under the influence of the contained springs $e^{10}$. The drums are expected to indicate, jointly, movements up to "$99.99" only, and therefore they make but a single rotation before being determined.

The foregoing parts constitute a complete and practical mechanism for indicating temporarily the sales. For the purpose of registering the aggregate amount of the sales I provide at the front of the machine, on a common shaft, three independently-turning register-wheels P P' $P^2$, each bearing on its periphery in regular order numbers from "0" to "99," the three wheels representing, respectively, from right to left cents, dollars, and hundreds of dollars. These wheels are connected with and receive motion from the finger-chains in the manner following: The first wheel P is fixed rigidly to the shaft $i$, so that it turns forward step by step with the latter, the motion of the shaft being such that the register-wheel will increase its registration each time an amount equal to the last indication effected by either of the first two chains. The wheel P carries on its side (see Fig. 5) a finger $p$, which at the completion of each revolution engages a pinion $p'$, acting on the spur-wheel $p^3$, attached to the side of the second register-wheel, whereby the second wheel is turned forward one tooth or number by each revolution of the first wheel. The second wheel P' is provided with a finger of the same character, operating in like manner to turn the third wheel $P^2$ step by step. These intermediate connections are to effect the automatic carrying over from one wheel to another. The second or intermediate wheel is fixed rigidly to the shaft operated by the dollar-chains $F^2$ and $F^3$, so that it receives a direct and positive motion therefrom in the same manner that the first wheel is driven by the first two chains. The third wheel receives motion only by the carrying devices from the second.

The parts last above described constitute a complete registering mechanism by which the total amounts of sales may be shown for a long period of time. They may be used either in connection with the indicator-drums or separately, it being obvious that the action of the chains upon the register-wheel is in no way dependent upon the presence of the indicator-wheels or their immediate connections.

I will now describe the mechanism for printing the individual registrations in succession. I provide each of the indicator-drums E around its periphery with a series of type corresponding in number and arrangement with the numerals thereon, but so located that whenever a given numeral is exposed through the front opening the corresponding type will be presented at the back of the machine. In the back of the machine I provide (see Figs. 4, 5, and 6) a paper or other strip or ribbon Q, arranged to wind from a lower drum $q'$ to an upper winding-drum $q^2$, having in one end a ratchet-wheel $q^3$, engaged by a pawl $q^4$ on a swinging arm $q^5$, from which a rod $q^6$ is extended downward to an angular weighted lever $q^7$, one end of which stands in the path of the rear edge of the till, so that when the till is closed the pawl is moved backward and that when the till is opened the pawl is advanced, so as to cause the feeding forward of the paper across the rear faces of the drums and their type. The paper is advanced one step each time that the till is opened. Transversely between the paper and the type of the drum I extend an inked ribbon R, winding from a drum $r$ at one end to a second drum $r'$ at the opposite end, the last-named drum being carried by a shaft $r^2$, connected by pinions $r^3$ and $r^4$ to the paper-winding drum, whereby the ribbon is caused to advance step by step across the type. In the back of the frame I mount on a horizontal shaft $s$ two upright striker-arms or hammers S, the upper ends of which are provided with rubber or other pads arranged to drive the paper against the ribbon, so that it will receive an impression of those type which happen to stand for the moment at the printing-point. At their lower ends these arms stand in such position as to be encountered by the lower end of the till as it is closed, whereby they are caused to effect the impression. Thus it is that the number exposed by the register-wheels at the front is printed by the type at the rear. An alarm-bell T and the pivoted striker therefor are mounted in the till, as shown in Fig. 8, and an arm $t^{10}$ fixed in the back of the case to act upon the striker and ring the bell as the drawer is moved. The register-wheels require to be set at zero whenever operations are to be commenced anew. The first two wheels may be turned forward at will, but the third wheel $P^2$, which is held by a pawl $p^{10}$ from retrograde motion, must be turned backward. For this purpose I provide, as shown in Fig. 5, a sliding rod $p^{11}$, which is extended to the rear of the machine and provided with a retracting-spring. When pushed inward, it will act upon and lift the pawl $p^{10}$ out of engagement.

The operation of the machine, briefly reviewed, is as follows: Assume the till to be closed and locked by its latch. The indicator-drums stand at zero and the register-drums exposing the total amount of sales made. The operator, placing his finger at the appropriate point on the first chain at the right, moves the same forward to the finishing-point, thus turning forward the register-wheel and winding up the spring of the intermediate wheel. This action is repeated in connection with as many of the chains as the amount may demand. The finger-button $c^3$ is then depressed, thereby unlocking the tray, which is immediately thrown open by the spring. The opening of the tray causes the feeding forward of the required strip and the ribbon, and at the same time the pawls holding the inking and printing drum are released, so that they return to the starting-point. The drawer being now closed, it acts to shift the intermediate wheels, so that the springs act to turn the indicator-drums, thereby exposing the amount of the last sale through the front opening and bringing the type to record such sale into printing position. The tray by its continued closing movement permits the intermediate wheels to fall forward again into engagement with the winding-wheels, and it also operates the strikers or hammers to cause the printing action. It is of course obvious that the operating-chains may be used in connection with the indicator-drums, the register-wheels, and the printing devices, or with any one or more of them.

Having thus described my invention, what I claim is—

1. In a cash-registering mechanism and in combination with the registering mechanism, an endless operating-chain exposed on one side to be moved with the finger, and an adjacent scale to determine the length of movement, and a stop device with which a link of the chain engages and by which the movement is arrested at the proper point.

2. In a cash-register and in combination with an endless chain arranged to operate the same, the finger-piece upon the chain, the depressed shoulder or stop with which the finger-piece in action may automatically engage to arrest the movement of the chain, and a spring to disengage the finger-piece from the stop when the finger is removed.

3. In a cash-register, the combination of an endless actuating-chain, a wheel turned thereby, an indicator-drum provided with a driving-wheel, an intermediate wheel and a driving-spring connected therewith, a till, and connections through which the till shifts the intermediate wheel from the chain-driving wheel, whereby the chain is caused to wind the spring and the latter therafter caused to turn the drum.

4. In a cash-register, the finger-chain and a gear-wheel driven thereby, in connection with an indicating-drum, a returning-spring therefor, and a gear-wheel connected thereto, with an intermediate movable wheel, a spring wound thereby, a detent to hold the same as the spring is wound, and means for engaging the intermediate wheel alternately with the chain-driving wheel and the drum-wheel and for releasing the detent when the engagement with the drum-wheel is effected.

5. In a cash-register, the finger-chain and the gear-wheel actuated thereby, in combination with the indicator-drum, its gear-wheel and returning-spring, the intermediate shifting wheel, its spring and detent mechanism, the detent to prevent backward motion of the indicator-drum, and devices whereby the intermediate wheel is engaged with the chain-driving wheel and the drum-wheel alternately and the detenting devices of the intermediate wheel and the drum-wheel released alternately.

6. In a cash-register, in combination with a finger-chain movable in one direction only, an indicator-wheel, a spring to turn the same backward, a detent to hold it against the stress of the spring, gearing through which the chain acts intermittingly to turn the drum forward, and means for releasing the detent that the drum may turn backward independently of the chain.

7. In a cash-register, in combination with a finger-chain, an indicator-drum, a returning-spring therefor, intermediate gearing whereby the drum is connected intermittingly with the chain, a register-wheel, and connections through which the wheel is driven by the chain always in the same direction.

8. In a cash-register, in combination with a finger-chain and a gear-wheel permanently connected therewith, an indicator-drum, a gear-wheel permanently connected therewith, an intermediate gear-wheel and a spring connected therewith, a till, connections through which the till causes the intermediate gear to engage the other wheels alternately, a spring to turn the drum backward, a detent to hold the drum, and means for automatically releasing the detent when the intermediate wheel engages the drum-wheel.

9. In a cash-register, the combination, with the type-carrying drum, of the finger-chain for turning the same, a scale adjacent to the chain to indicate the amount of movement required, a stop to engage and arrest the chain at the proper point, an impression mechanism, and a movable till to operate the impression mechanism and produce a printed record.

10. In a cash-register, the finger-chain, the drum bearing type, intermediate connections through which the chain turns the drum, an impression mechanism, and a till by which the impression mechanism is actuated.

11. In a cash-register, in combination with the finger-chain, the gear connected therewith, the intermediate gear, the till and its connections to shift the intermediate gear, the winding-spring connected with the last-named gear, the detent therefor, the drum bearing type, its gear-wheel and detent, the impression mechanism, and the till arranged to release the detents and actuate the impression mechanism, substantially as described.

12. In a cash-register, in combination with the series of indicator-drums, their gear-wheels, returning-springs, and detents, the finger-chains, their gears connected therewith, the register-wheels turned by said gears, the intermediate shifting-gears, the springs moved thereby, their detents, and the tray arranged to release the detents.

13. In a cash-register, in combination with the finger-chains, the register-wheels geared thereto, the indicator-drums, their returning-springs and detents, the intermediate shifting-gears, their winding-springs and detents, the movable till, devices through which the till shifts the gear and actuates the detents, a spring to force the till open, and a latch to hold the till shut.

14. In a cash-register, the combination of a drum or wheel provided with peripheral type, a finger-chain and connections through which it turns the drum, a scale adjacent to the chain to indicate the extent of movement, a stop to engage and arrest the chain, an ink-ribbon, a paper-feeding mechanism, a sliding till, and an impression mechanism projecting into the path of the till and positively thrown against the drum thereby.

In testimony whereof I hereunto set my hand, this 12th day of February, 1892, in the presence of two attesting witnesses.

WARREN F. BECK.

Witnesses:
J. W. CLAMSON,
B. I. TISDEL.